Figure 1:
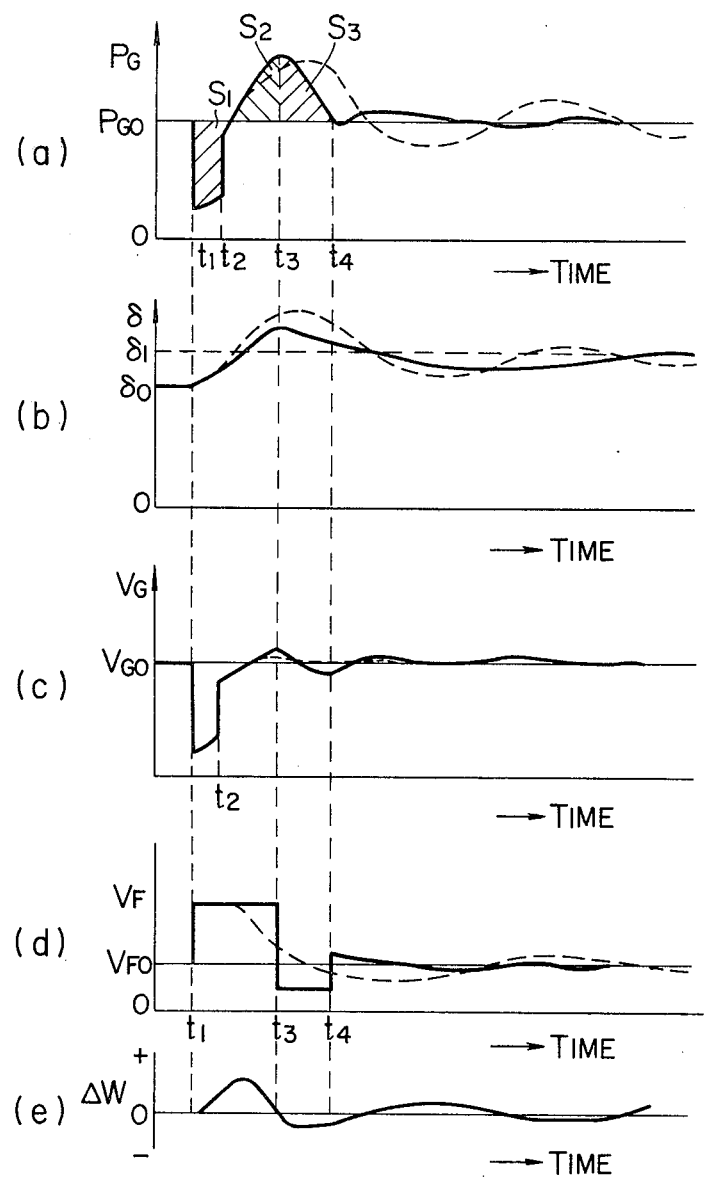

United States Patent [19]

Aotsu et al.

[11] 4,326,159
[45] Apr. 20, 1982

[54] METHOD AND APPARATUS FOR CONTROLLING EXCITATION OF A GENERATOR

[75] Inventors: Hiroaki Aotsu, Nakaminato; Akira Isono, Hitachi; Tsutomu Inayama, Hitachi; Mamoru Fukushima, Hitachi, all of Japan

[73] Assignees: Hitachi, Ltd.; Hitachi Engineering Co., Ltd., both of Tokyo, Japan

[21] Appl. No.: 71,403

[22] Filed: Aug. 30, 1979

[30] Foreign Application Priority Data

Aug. 1, 1979 [JP] Japan .................................. 54-97308

[51] Int. Cl.³ ............................................. H02P 9/10
[52] U.S. Cl. ...................................... 322/19; 322/22; 361/20
[58] Field of Search ............................. 322/17, 19–25, 322/28, 37, 59, 61, 72, 75, 80; 361/20, 21

[56] References Cited

U.S. PATENT DOCUMENTS

| | | | |
|---|---|---|---|
| 3,477,014 | 11/1969 | Bluthe | 322/19 |
| 3,652,920 | 3/1972 | South et al. | 322/25 |
| 3,818,317 | 6/1974 | Isono et al. | 322/19 |
| 3,956,637 | 5/1976 | Aotsu et al. | 290/40 R |

FOREIGN PATENT DOCUMENTS 434555  11/1974  U.S.S.R. ................................. 322/22

*Primary Examiner*—Robert J. Hickey
*Attorney, Agent, or Firm*—Craig and Antonelli

[57] ABSTRACT

Voltage, current and field voltage of a generator connected to an electric power system are sampled at a predetermined period for analog-digital conversion and then led to a digital computer. In addition to computation for AVR, the computer computes from its input the generator output power, and also monitors the occurrence of a fault, the removal of the fault and variation in the generator output in the system. After the occurrence of a fault, the field excitation of the generator is intensified until the generator output power reaches substantially a peak value, but after the peak value is substantially passed by, the excitation is conversely depressed to a value below the level which is present before the fault occurs. When the generator output power recovers the value which is present before the fault occurs, the computer returns to deliver the AVR output.

14 Claims, 11 Drawing Figures

METHOD AND APPARATUS FOR CONTROLLING EXCITATION OF A GENERATOR

The present invention relates to method and apparatus for controlling the excitation of a generator.

When a fault occurs in an electric power system, the terminal voltage of a generator is reduced and the transmission power decreases. A protective relay system removes the fault in a relatively short period of time. Within the short period of time, however, the input to the generator remains the same as that received by the generator before the fault occurs and hence an unbalance between the input and the output of the generator results, giving rise to an increase of the internal phase angle. Removal of the fault recovers the power transmission capability and the internal phase angle further increases with the result that the transmission power exceeds the input to the generator. The unbalance between the input and the output decelerates the generator and eventually, the generator runs stably at an internal phase angle in accordance with conditions of the electric power system after the fault has been removed.

When considering such a transient operation of the generator, it is of great significance to intensify the excitation so that the transmission power grows as large as possible to suppress the large increase of the internal phase angle. Two of the inventors of the present invention have already discussed an approach to this problem in U.S. Pat. No. 3,818,317.

After the internal phase angle has reached a first occuring peak value, the generator undergoes a deceleration force owing to a transmission power exceeding the input to the generator and the transmission power traces a damped oscillation with respect to the generator input to reach an ultimate stable value.

An object of the present invention is to provide method and apparatus for controlling the excitation which can suppress the damped oscillation to rapidly attain the ultimate stable state.

To accomplish the above object, according to the invention, when the internal phase angle of a generator has substantially reached the first occuring peak value, which is called hereinafter merely "peak value", the amount of field excitation of the generator is controlled such that the excitation is made smaller than that applied to the field of the generator before a fault occurs, whereby the transmission power can be suppressed to reduce a deceleration force the generator undergoes. When the output of the generator has reached substantially the same level as that delivered out of the generator before the fault occurs, the excitation is controlled by a normal voltage control signal, whereby the generator output can rapidly be stabilized and the generator can smoothly be returned to its stationary operation.

Figure 2:
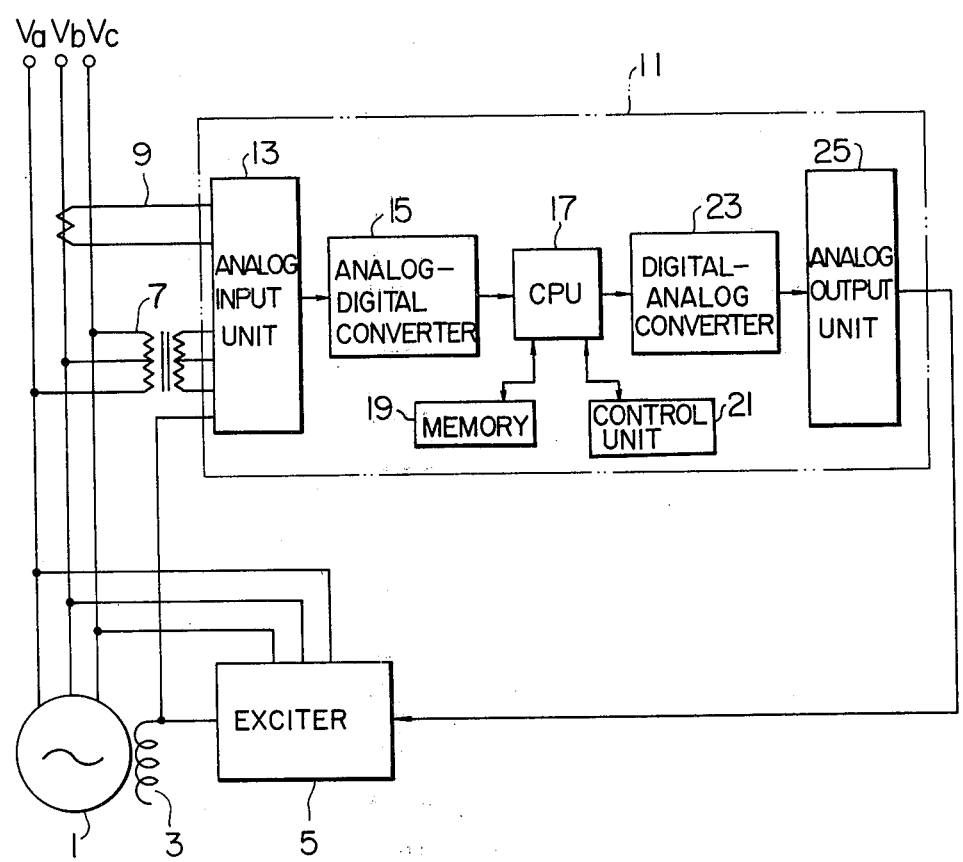

The invention will be explained in detail with reference to the accompanying drawings, in which:

FIGS. 1(a)–1(e) show various wave-form diagrams useful to explain effects brought about by the invention;

FIG. 2 is a circuit diagram, partly in block form, showing one embodiment of the invention; and FIGS. 3 and 4, and FIGS. 5A to 5C are examples of flow chart showing the controlling steps according to the invention.

FIG. 1 is illustrative of effects brought about by the invention, and (a)–(e) in FIG. 1 show a generator output power $P_G$, an internal phase angle $\delta$, a generator output voltage $V_G$, a field voltage $V_F$ and a variation $\Delta\omega$ in generator speed (or internal frequency), respectively, upon occurrence of a fault. To show values these factors take before a fault occurs, a suffix "0" is added to the above characters representative of these factors. Characters $t_1$, $t_2$, $t_3$ and $t_4$ respectively represent times at which a fault occurs, the fault is removed, the internal phase angle reaches the peak value, and the generator output power recovers. According to the invention, in compliance with a decrease in the generator output power $P_G$ as shown at the solid curve in FIG. 1(a) which takes place during an interval $t_1$ to $t_2$, the generator undergoes an acceleration force corresponding to an area $S_1$ before time $t_2$ has elapsed, and in compliance with an increase in the excitation and in the internal phase angle $\delta$ during an interval $t_2$ to $t_3$, the generator undergoes a deceleration force corresponding to an area $S_2$. When $S_1=S_2$ holds at time $t_3$, the internal phase angle $\delta$ reaches the peak value. As described in the aforementioned U.S. patent, it is possible to suppress the increase in the internal phase angle $\delta$ to some extent by intensifying the excitation during the interval $t_2$ to $t_3$. In FIG. 1(d), the excitation is shown as being intensified during a interval $t_1$ to $t_3$. This is because the excitation can automatically be intensified during the interval $t_1$ to $t_2$ by means of a conventional automatic voltage regulator which controls the excitation is accordance with a deviation between a reference voltage value and a terminal voltage of the generator.

In the present invention, during the interval $t_3$ to $t_4$ through which the internal phase angle $\delta$ reaches the peak value and then the generator output power returns to an output level the generator takes before the fault occurs, the excitation is intentionally depressed to reduce a deceleration force (corresponding to an area $S_3$) impressed upon the generator. Consequently, in contrast to a response as shown at the dashed curve in FIG. 1(a) which is achieved by the conventional automatic voltage regulator and in which the generator output power traces a prolonged, large-amplitude oscillation before it eventually stabilizes, the generator output power can stabilize rapidly in accordance with the invention, ensuring that the generator can shift to its stable operation rapidly and smoothly. Character $\delta_1$ represents a scheduled internal phase angle the generator takes after the fault has been removed.

Comparison of the solid curve with the dashed curve in FIG. 1(c) will show that the intentional intensification or depression of the excitation in accordance with the invention results in a somewhat large fluctuation in the generator voltage. Such a fluctuation can easily be confined within a practically sufficient range and therefore is negligible.

Referring now to FIG. 2, the invention will be described by way of an embodiment principally incorporating a digital computer. In the figure, reference numeral 1 designates a synchronous generator, 3 a field winding of the synchronous generator, 5 an exciter, 7 a voltage transformer, 9 a current transformer, and 11 an excitation controller. The excitation controller 11 includes an analog input unit 13, an analog-digital converter 15, a central processing unit 17, a memory 19, a control unit 21, a digital-analog converter 23, and an analog output unit 25.

The field winding 3 is controlled for its excitation by the exciter 5 which in turn is responsive to a signal fed from the excitation controller 11.

Used as analog inputs in this embodiment are phase voltages $V_a$, $V_b$ and $V_c$, a b-phase current $I_b$ and a field voltage $V_F$, and stored in the memory 19 are various examination references such as for example, a reference voltage value $V_{GR}$ of the generator, a generator voltage $V_1$ and output power $P_1$ used for judging occurrence of a fault, a generator voltage $V_2$ used for judging removal of the fault, and data for determining the field voltage during the interval $t_3$ to $t_4$.

Figure 3:
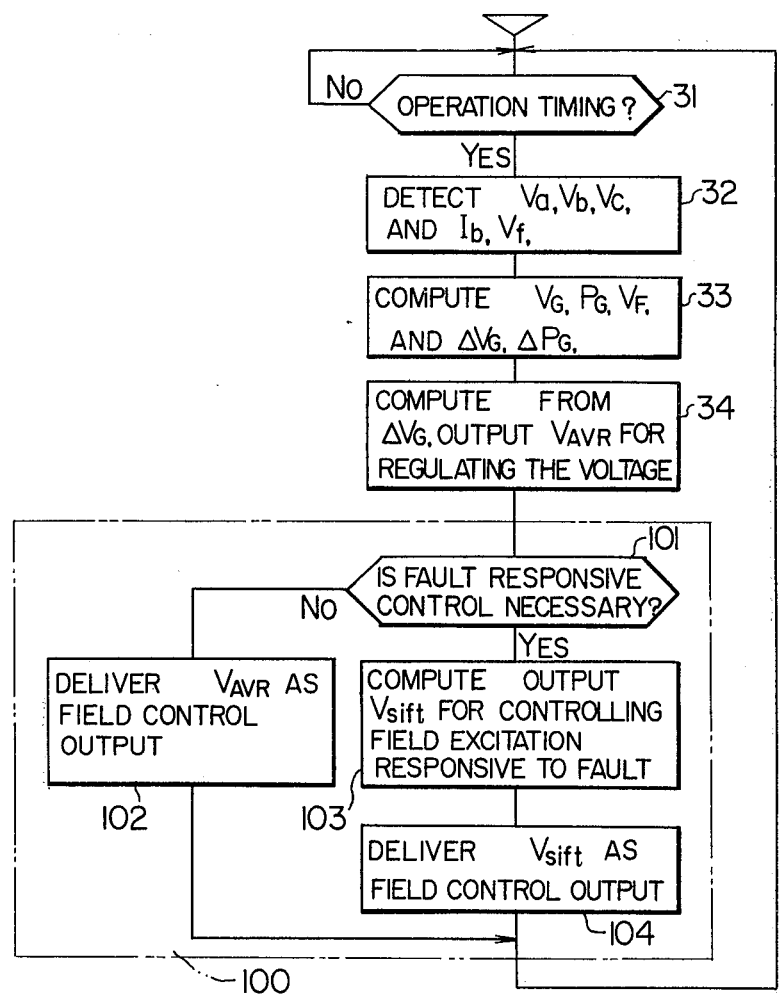
Figure 4:
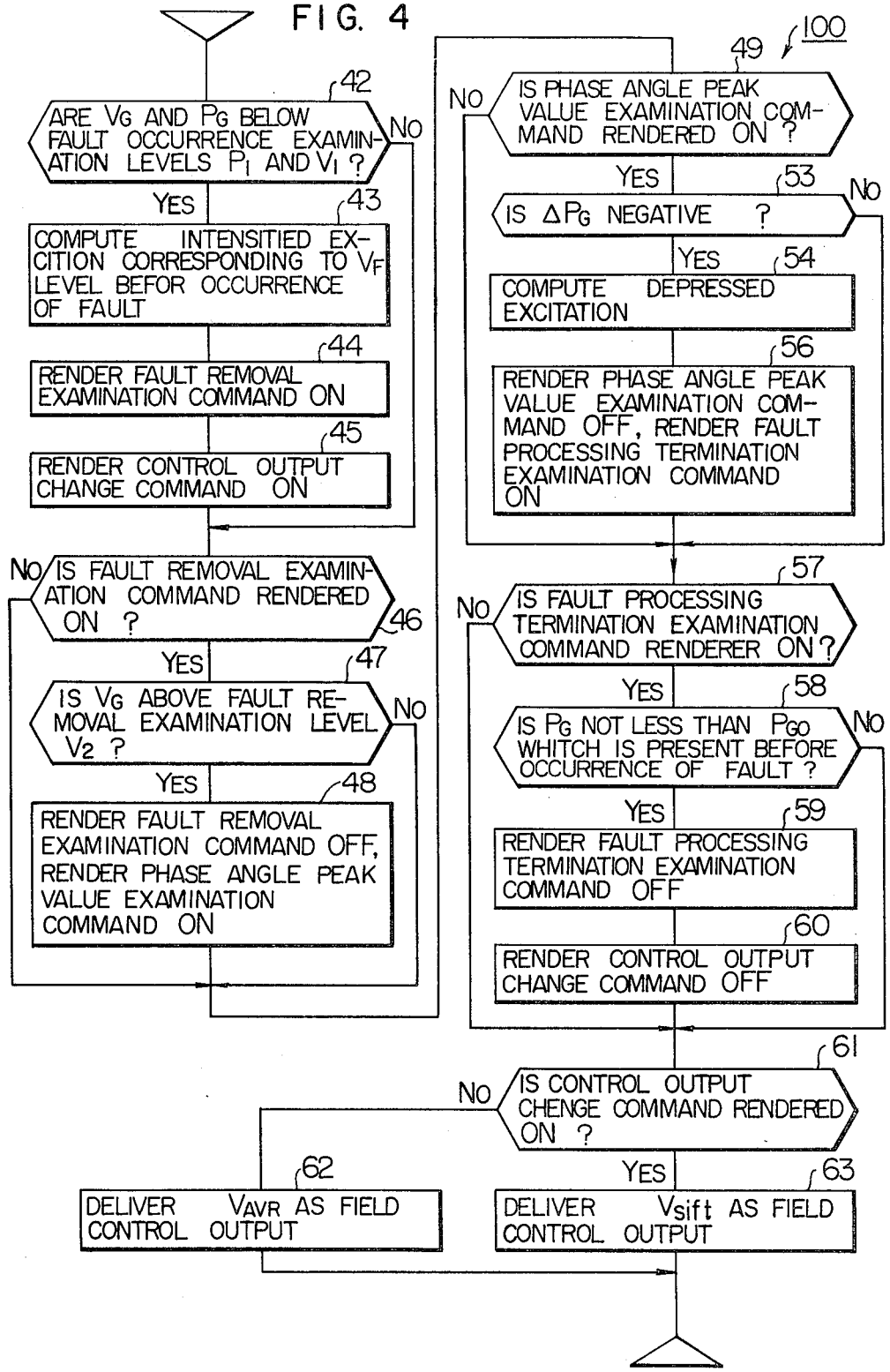

The basic processing of the FIG. 2 embodiment is carried out in accordance with a flow chart as shown in FIG. 3 when the digital computer in the central processor unit receives inputs periodically. When the examination in step 31 indicates that an operation timing is present, the analog inputs are detected in Step 32 and the generator voltage $V_G$, generator output power $P_G$, field voltage $V_F$, voltage deviation $\Delta V_G$ and output deviation $\Delta P_G$ are then computed in Step 33. Values of these factors are computed in accordance with the following operational equations, for example, where i represents the order of sampling timing:

$$V_G = \text{Max}(|V_a|,|V_b|,|V_c|)_i + \text{Max}(|V_a|,|V_b|,|V_c|)_{i-1} + - + \text{Max}(|V_a|,|V_b|,|V_c|)_{i-n}$$

$$P_G = V_{bi} \cdot I_{bi} + V_{bi-1} \cdot I_{bi-1} + - + V_{bi-n} \cdot I_{bi-n}$$

$$V_F = V_{fi} + V_{fi-1} + V_{fi-2} + - + V_{fi-n}$$

$$\Delta V_G = V_G - \{\text{Max}(|V_a|,|V_b|,|V_c|)_{i-1} + \text{Max}(|V_a|,|V_b|,|V_c|)_{i-2} + - + \text{Max}(|V_a|,|V_b|,|V_c|)_{i-n-1}\}$$

$$\Delta P_G = P_G - \{V_{bi-1} \cdot I_{bi-1} + V_{bi-2} \cdot I_{bi-2} - + V_{bi-1} \cdot I_{bi-n-1}\}$$

In Step 34, an output $V_{AVR}$ is computed from $\Delta V_G$, which output controls the generator voltage $V_G$ such that it is made constant. This computation is carried out in accordance with $V_{AVR} = V_{GR} - V_G$, for example.

Next, the examination proceeds to judge presence or absence of necessity of a fault responsive controlling in Step 101. If "NO", the $V_{AVR}$ is directly delivered to the exciter 5 in Step 102. If "YES", a field control output $V_{sift}$ responsive to the fault is computed in Step 103 and delivered to the exciter 5 in Step 104. Accordingly, the exciter 5 delivers out a field voltage in accordance with the $V_{AVR}$ and $V_{sift}$.

Turning now to FiG. 4 and FIGS. 5A to 5C, one example of handling the fault processing will be described.

In Step 42, the generator voltage $V_G$ and the generator output power $P_G$ are examined as to whether or not they are below the critical levels $V_1$ and $P_1$ indicative of occurrence of the fault. If "NO", Steps 43 to 45 are passed by. If "YES", an increment of excitation is computed in compliance with the field voltage $V_F$ which is valid before occurrence of the fault in Step 43. In Step 44, a fault removal examination command is rendered "ON" in advance. In Step 45, a control output change command is also rendered "ON" in advance. In Step 46, "ON" or "OFF" of the fault removal examination command is judged. If not "ON" wherein there is no fault occurred in the electric power system, the judgement of "NO" will be made in the Steps 46, 49, 57 and 61 and hence the succeeding steps other than these steps are passed by, and Step 62 functions to deliver out the $V_{AVR}$. If "ON" wherein the examination indicates occurrence of the fault in the electric power system, so long as the fault removal examination command is rendered "ON" in Step 44, a judgement is made in Step 47 as to whether or not the generator voltage $V_G$ recovers to exceed a fault removal examination level $V_2$. If the fault continues (during the interval $t_1$ to $t_2$), the output from Step 43 and processing in Step 45 cooperate to activate Steps 61 and 63, thus delivering out the $V_{sift}$ for intensifying the excitation. If $V_G \geq V_2$, the examination proceeds to Step 48 in which the fault removal examination level is rendered "OFF" and a phase angle peak value examination command is rendered "ON". The "ON" of this command is judged in Step 49. Immediately after the fault has been removed, the generator output power $P_G$ is necessarily increased so that $\Delta P_G$ is also positive without fail. Accordingly, when the examination in Step 53 indicates that $\Delta P_G$ has changed to negative, it is detected that the internal phase angle has reached the peak value. While Step 53 is rendered "NO", a computation result obtained in Step 43 is delivered out via Steps 61 and 63, thus intensifying the excitation. If Step 53 is rendered "YES" wherein the internal phase angle has passed through the peak value, an excitation depression computation necessary for depressing the excitation is carried out in Step 54. In accordance with a result of the depression computation, the output based on the excitation intensifying computation is replaced by an output based on the excitation depression computatoin. In Step 56, the phase angle peak value examination command is rendered "OFF" and a fault processing termination examination command is rendered "ON". The "ON" of this command is judged in Step 57. The fault processing termination is examined in Step 58 by judging whether or not the $P_G$ is returned to substantially the same as or larger than the $P_{GO}$. If "NO", the computation result obtained in Step 54 is delivered out via Steps 61 and 63. If "Yes" wherein time $t_4$ has elapsed, the fault processing termination examination command and the control output change command are rendered "OFF" in Steps 59 and 60. As a result, Step 61 functions to indicate "NO" and hence, the generator is controlled by the $V_{AVR}$ in the normal operation after time $t_4$ has elapsed.

Figure 5A:
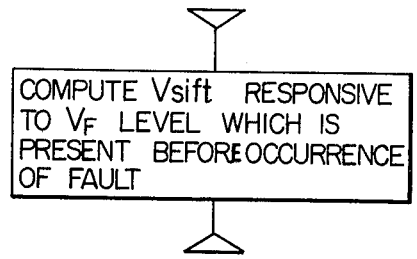
Figure 5B:
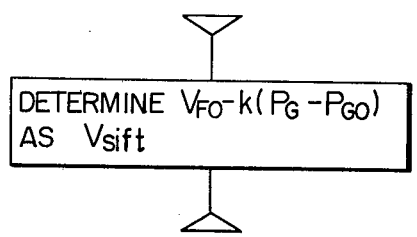
Figure 5C:
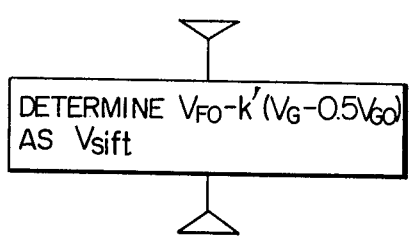

Various processing exemplified in FIGS. 5A to 5C are employed in Step 54 for depressing the excitation to a level which is below the level applied before occurrence of the fault. So-called table look-up process as shown in FIG. 5A selects a $V_{sift}$ in compliance with the level $V_F$ which is present before occurrence of the fault. In FIG. 5B, $V_{FO} - k(P_G - P_{GO})$ is used as a $V_{sift}$, where k is a constant. In FIG. 5C, $V_{FO} - k'(V_G - 0.5 V_{GO})$ is used as a $V_{sift}$, where k' is a constant. In both examples of FIGS. 5B and 5C, the term within the parenthesis is computed as positive so that the $V_{sift}$ can reduce the field voltage $V_F$ below $V_{FO}$. Where the excitation during the interval $t_3$ to $t_4$ is determined by any one of the processes exemplified above or by other suitable processes, it is important that the value of that excitation be below the $V_{FO}$ which is present before occurrence of the fault and above a lower limit of operation allowable value of the generator.

As described above, according to the invention, the excitation is intensified to suppress the increase in the internal phase angle (acceleration force) when a fault occurs and the excitation is depressed to suppress the deceleration force after the internal phase angle has reached peak value, whereby the transient stability of the generator can be improved.

It should be understood that the invention can be modified as follows:

(1) In place of computing an equivalent of the internal phase angle from the generator output power, the internal phase angle may be computed directly from generator voltage and current.

(2) The interval $t_3$ to $t_4$ may be determined by corresponding to the generator output power at time $t_3$. This is based on the fact that constants of the generator and the electric power system permit the correspondence.

(3) The interval $t_3$ to $t_4$ may be determined by the area $S_1$ for the same reason as in (2).

It is also appreciated that times $t_1$, $t_2$, $t_3$ and $t_4$ are not required to strictly correspond to the occurrence of fault, removal of fault, internal phase angle peak value and recovery of generator output, respectively. Obviously, substantially correspondences are satisfactory.

What we claim is:

1. A method for controlling the excitation of a generator connected to an electric power system by controlling its field in response to the generator voltage comprising the steps of:
   increasing, when a fault occurs in the electric power system, the field excitation such that it exceeds a level which is present before the fault occurs during a time interval after the fault is removed until the internal phase angle of the generator substantially reaches a peak value; and
   decreasing the field excitation such that it falls below said level after the interval phase angle has substantially passed through the peak value.

2. A method for controlling the excitation of a generator connected to an electric power system by controlling its field in response to the generator voltage comprising the steps of:
   increasing, when a fault occurs in the electric power system, the field excitation such that it exceeds a level which is present before the fault occurs during a time interval after the fault is removed until the internal phase angle of the generator substantially reaches a peak value; and
   decreasing the field excitation such that it falls below said level during a time interval after the internal phase angle has substantially passed through the peak value until the generator output returns to substantially the same level as that present before the fault occurs.

3. A method for controlling the excitation of the generator according to claim 2, wherein a signal representative of the generator output power is used as a signal representative of the internal phase angle.

4. A method for controlling the excitation of the generator according to claim 2, wherein the time interval through which the excitation is decreased is determined in accordance with the generator output power which is present when the internal phase angle or generator output power substantially reaches a peak value.

5. A method for controlling the excitation of the generator according to claim 2, wherein the time interval through which the excitation is decreased is determined in relation with the generator output power which is present when the fault occurs and a time interval between occurrence of the fault and removal thereof.

6. A method for controlling the excitation of the generator according to any one of claims 1 to 5, wherein determination of the amount of the decreased excitation depends on a lower limit of the generator output voltage.

7. A method for controlling the excitation of a generator connected to an electric power system by controlling its field in response to the generator voltage comprising the steps of:
   increasing, when a fault occurs in the electric power system, the field excitation such that it exceeds a level which is present before the fault occurs during a time interval through which the power transmission is effected at a power which is larger than the generator input by an amount which compensates for a decreased power in the power transmission due to the fault; and
   decreasing the field excitation such that it falls below said level when said time interval has elapsed.

8. A method of controlling the excitation of a generator connected to an electric power system by controlling its field in response to the generator voltage comprising the steps of:
   increasing, when a fault occurs in the electric power system, the field excitation such that it exceeds a level which is present before the fault occurs during a first time interval through which the power transmission is effected at a power which is larger than the generator input by an amount which compensates for a decreased power in the power transmission due to the fault; and
   decreasing the field excitation such that it falls below said level during a second time interval after the first time interval has elapsed until the generator output returns to substantially the same level as that present before the fault occurs.

9. A method for controlling the excitation of the generator according to claim 7 or 8, wherein the time interval through which the excitation is decreased is determined in accordance with the generator output power which is present when the internal phase angle or generator output power substantially reaches a peak value.

10. A method for controlling the excitation of the generator according to claim 7 or 8, wherein the interval through which the excitation is decreased is determined in relation with the generator output power which is present when the fault occurs and a time interval between occurrence of the fault and removal thereof.

11. A method for controlling the excitation of the generator according to claim 7 or 8, wherein determination of the amount of the decreased excitation depends on a lower limit of the generator output voltage.

12. Apparatus for controlling the excitation of a generator comprising:
   first means for detecting, at predetermined periods, voltage, current, and field voltage of the generator connected to an electric power system;
   second means for converting an output of the first means into a digital output signal;
   third means for carrying out a predetermined operation processing of the digital output signal of the second means within each of the predetermined periods in accordance with a stored program;
   fourth means for storing the program;
   fifth means for storing the digital output signal of the second means and an output of the third means;
   sixth means for storing data to be used as reference values for examination; and
   seventh means for controlling the field excitation of the generator by the output of the third means,
   said third means including means for computing the generator output power from the voltage and current, delivering an output for intensifying the field excitation of the generator to a predetermined value, when a computation result from the present period is decreased below a computation result from an immediately preceding period by more than a predetermined value, and thereafter delivering an output for depressing the field excitation such that it falls below a value which is present immediately before the excitation is intensified to the predetermined value, when a computation result of the generator output power which falls below a computation result from an immediately preceding period is detected.

13. Apparatus for controlling the excitation of a generator comprising:
   first means for detecting, at predetermined periods, voltage, current and field voltage of the generator connected to an electric power system;
   second means for converting an output of the first means into a digital output signal;
   third means for carrying out a predetermined operation processing of the digital output signal of the second means within each of the predetermined periods in accordance with a stored program;
   fourth means for storing the program;
   fifth means for storing the digital output signal of the second means and an output of the third means;
   sixth means for storing data to be used as reference values for examination; and
   seventh means for controlling the field excitation of the generator by the output of the third means,
   said third means including means for computing the generator output power from the voltage and current, delivering an output for intensifying the field excitation of the generator to a predetermined value, when a computation result from the present period is decreased below a computation result from an immediately preceding period by more than a predetermined value, thereafter delivering an output for depressing the field excitation such that it falls below a value which is present immediately before the excitation is intensified to the predetermined value, when a computation result of the generator output power which falls below a computation result from an immediately preceding period is detected, and then delivering an output for stopping the output for depressing the field excitation, when the subsequent output power of the generator becomes substantially the same as the generator output power which is present before the output for intensifying the field excitation is delivered.

14. A method according to claim 2, further comprising setting said field excitation at said level which was present before the fault occurs after said generator output returns to substantially the same level as that present before the fault occurs.

* * * * *